(12) United States Patent
Hirao (10) Patent No.: US 7,577,300 B2
(45) Date of Patent: Aug. 18, 2009

(54) APPARATUS AND METHOD OF ENCODING AND DECODING DIGITAL IMAGES USING PARALLEL PROCESSING OF BIT-PLANES (75) Inventor: Koichiro Hirao, Shizuoka (JP)

(73) Assignee: NEC Corporation, Tokyo (JP)

( * ) Notice: Subject to any disclaimer, the term of this patent is extended or adjusted under 35 U.S.C. 154(b) by 799 days.

(21) Appl. No.: 11/016,265

(22) Filed: Dec. 17, 2004

(65) Prior Publication Data
US 2005/0147306 A1 Jul. 7, 2005

(30) Foreign Application Priority Data
Dec. 19, 2003 (JP) ............................. 2003-422978

(51) Int. Cl.
G06K 9/36 (2006.01)
(52) U.S. Cl. ..................................... 382/232
(58) Field of Classification Search .................. 382/232
See application file for complete search history.

(56) References Cited

U.S. PATENT DOCUMENTS
7,133,567 B2 * 11/2006 Ohyama et al. ............. 382/246

FOREIGN PATENT DOCUMENTS
| JP | 2002-159009 | 5/2002 |
| JP | 2003-8906 | 1/2003 |
| JP | 2003-032496 | 1/2003 |
| JP | 2003-087571 | 3/2003 |
| JP | 2003-101951 | 4/2003 |
| JP | 2003-153228 | 5/2003 |
| JP | 2004-120466 | 4/2004 |

OTHER PUBLICATIONS

Christopoulos et al.; "The JPEG2000 Still Image Coding System: An Overview"; IEEE vol. 46, No. 4, pp. 1103-1127, Nov. 2000.*

* cited by examiner

Primary Examiner—Vikkram Bali
Assistant Examiner—Eueng-Nan Yeh
(74) Attorney, Agent, or Firm—Scully, Scott, Murphy & Presser, P.C.

(57) ABSTRACT

An image encoding apparatus comprises first processing means for determining whether or not each bit in a bit plane of a code block should be processed in a first pass, and second processing means for determining whether or not each bit in a bit plane of a code block should be processed in a second pass which is other than the first pass. The first processing means and the second processing means operate in parallel for the same bit plane of the same code block. The first pass is a SIG (significance propagation) pass used in the processing of JPEG-2000 image compression/decompression scheme, for example, and the second pass is a REF (magnitude refinement) pass used in the JPEG-2000 processing.

22 Claims, 6 Drawing Sheets

APPARATUS AND METHOD OF ENCODING AND DECODING DIGITAL IMAGES USING PARALLEL PROCESSING OF BIT-PLANES

BACKGROUND OF THE INVENTION

1. Field of the Invention

The present invention relates to a method and apparatus for encoding a digital image and a method and apparatus for decoding an encoded digital image.

2. Description of the Related Art

Digital images have been utilized at increasingly more opportunities due to the widespread proliferation of the Internet and digital still cameras. However, digital images have large data sizes and therefore involve data compression for preservation and for use in communications. JPEG (Joint Photographic Experts Group) format is widely known as a general image compression format. JPEG format, which has been globally standardized, is now regarded as an indispensable compression scheme for handling digital images. JPEG-2000 (ISO/IEC 15444-1 or ITU-T Recommendation T.800) format has been standardized as a global standard for a next-generation image compression scheme which will substitute for JPEG. JPEG-2000 improves the image quality at lower bit rates, as compared with conventional JPEG, as well as supports lossless and lossy compressions, improve the ease of handling for an extensive progressive function and the like, and is therefore expected for proliferation in the future. However, JPEG-2000 format entails more complicated computations and a larger number of arithmetic operations than JPEG. Therefore, when a JPEG-2000 codec is implemented in hardware or in software, the resulting processing speed is necessarily lower than JPEG.

Figure 1:
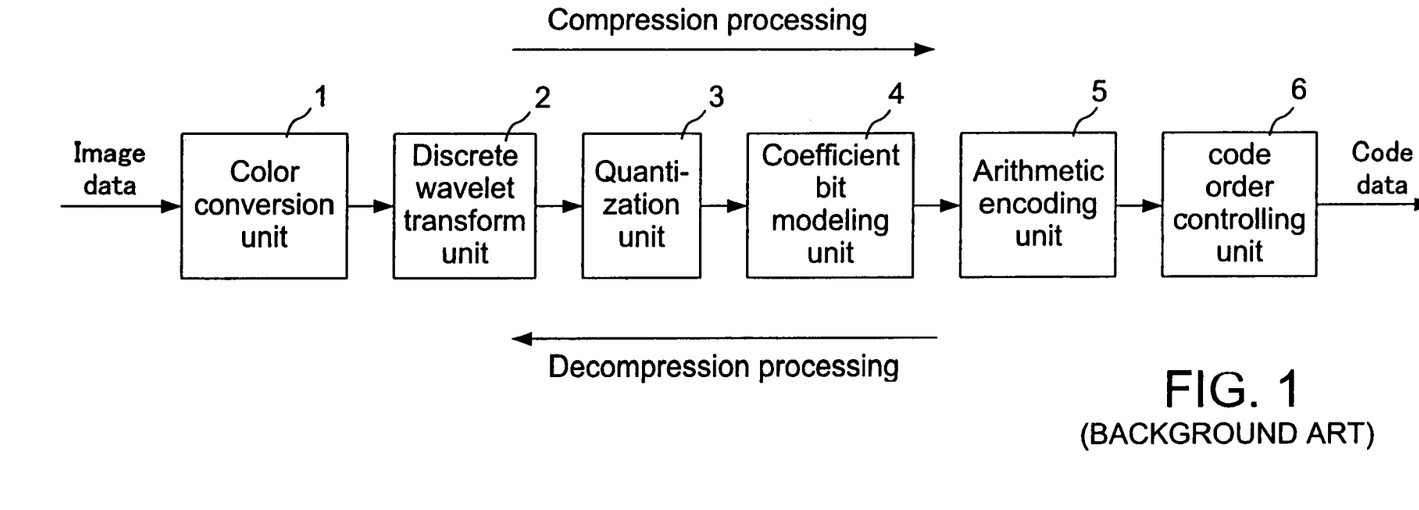
FIG. 1 is a block diagram illustrating the configuration of JPEG-2000-based image compression/decompression apparatus.

FIG. 1 illustrates the configuration for performing the processing associated with JPEG-2000 format. When image or picture data is compressed in accordance with JPEG-2000 format, the processing is performed in order from the left block to the right block. Conversely, for decompressing data compressed in accordance with JPEG-2000 into an image, the processing is performed in order from the right block to the left block in FIG. 1.

During compression processing, image data chromatically converted in color conversion unit 1 is wavelet-transformed by discrete wavelet transform unit 2 to generate wavelet coefficients. The generated wavelet coefficients are quantized by quantization unit 3, and then, a context and a bit (i.e., a bit to be compressed) used in next arithmetic encoding unit 5 are determined for each bit plane in coefficient bit modeling unit 4. Arithmetic encoding unit 5 encodes the bits using the context determined by coefficient bit modeling unit 4, and encoded data is rearranged in accordance with a prescribed format in code order control unit 6 to generate a JPEG-2000 code stream.

During decompression processing, on the contrary, code data is extracted from a JPEG-2000 code stream, and a bit is decoded by arithmetic encoding unit 5 using a context determined by coefficient bit modeling unit 4. Coefficient bit modeling unit 4 then determines data for each of bit planes that make up wavelet coefficients using the decoded bit. The decoded bit is further used for generating a context for decoding the next bit. After data of all bit planes have been decoded, decoded data is inverse quantized in quantization unit 3. Subsequently, the inverse-quantized data is inverse-wavelet-transformed in discrete wavelet transform unit 2 for transformation into image data. The transformed data is chromatically converted in color conversion unit 1 to eventually reproduce an image.

For description on detailed processing of JPEG-2000, refer to ISO/IEC 15444-1 or ITU-T Recommendation T.800.

In FIG. 1, coefficient bit modeling unit 4 and arithmetic encoding unit 5 process the wavelet coefficients generated through the wavelet transform and quantization on a bit-by-bit basis for each bit plane. This processing entails an immense amount of computational operations, and can be speeded by efficiently performing these operations. The following description will be centered on coefficient bit modeling processing performed by coefficient bit modeling unit 4.

Figure 2:
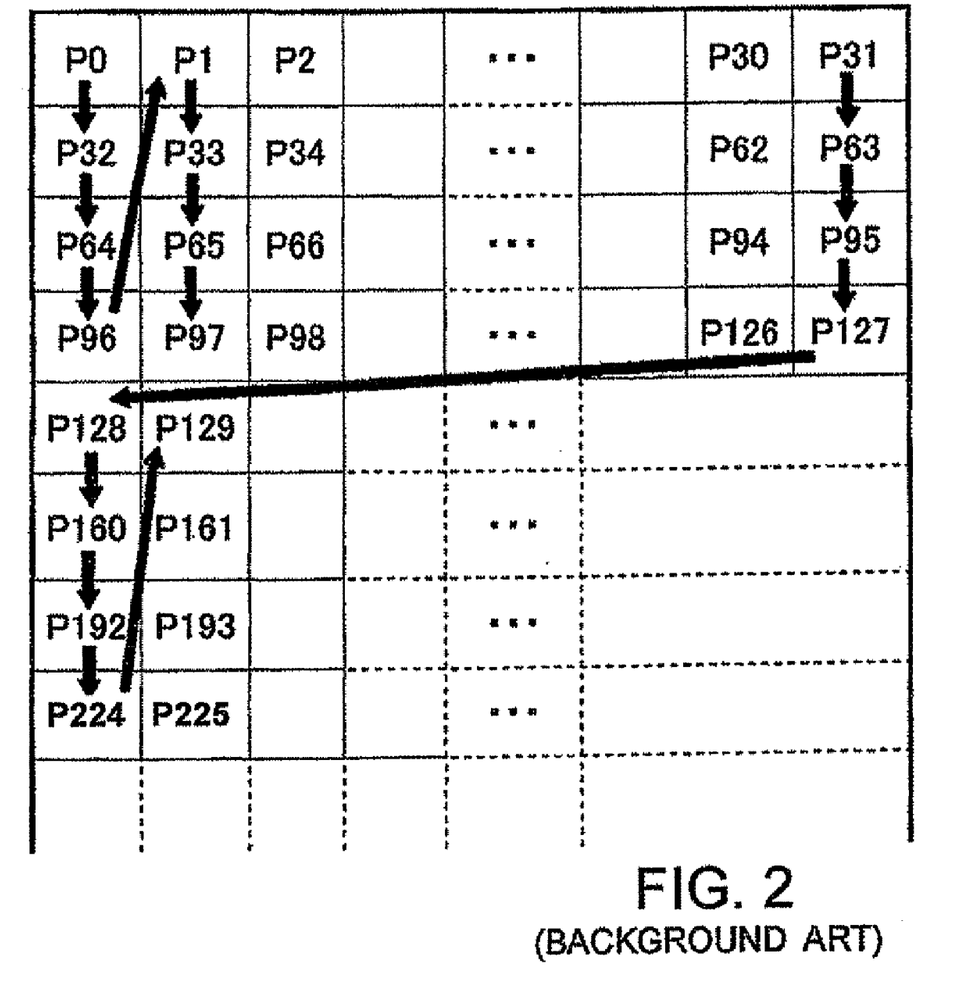
FIG. 2 is a diagram showing a scanning direction on a bit plane in coefficient bit modeling.

Wavelet coefficients generated by applying the wavelet transform and quantization to image or picture data are divided into coding units called "code blocks," such that the encoding processing is performed in units of code blocks. After one code block is processed, the next code block is processed. The size of the code block is restricted to some degree by JPEG-2000 standard, and in general, a 64×64 code block (64 pixels in the horizontal direction and 64 pixels in the vertical direction) or a 32×32 code block is mainly used in the encoding processing. The coefficient bit plane processing and arithmetic encoding are also performed in units of the code blocks. Each wavelet coefficient in a code block is processed in order from a higher rank bit plane. Specifically, at the time the topmost bit plane of the wavelet coefficients has been encoded within a code block, the next bit plane is encoded. This processing is repeated until a predetermined lower rank bit plane. Within a bit plane, as shown in FIG. 2, first encoded are four coefficients (P0, P32, P64, P96) in the vertical direction, and next encoded are four coefficients (P1, P33, P65, P97) to the right of the encoded coefficients in the horizontal direction. When four coefficients (P31, P63, P95, P127) at the right end of the code block have been processed, the coordinate in the horizontal direction returns to the left end of the code block, and the processing proceeds to the next four coefficients (P128, P160, P192, P224), advanced by four in the vertical direction. In this way, coefficients are encoded in the bit plane.

In the coefficient bit modeling processing, a context and a bit to be compressed are generated for each bit plane using one of three passes: a significance propagation pass, a magnitude refinement pass, and cleanup pass. Here, the context refers to a value which is generated in accordance with the state around a coefficient to be compressed, and is used in arithmetic encoding.

In the significance propagation pass (hereinafter called the "SIG pass"), when there is a coefficient which is not significant (i.e., the coefficient is insignificant), but is surrounded by eight peripheral neighboring coefficients, at least one of which is significant, this coefficient is processed in the significance propagation pass. A significant coefficient, herein used, refers to a coefficient which has been processed on a bit plane higher than a current bit plane, or the bit plane itself, in which "1" has already appeared. When a coefficient is subjected to the processing of the SIG pass, the state around the coefficient of interest is monitored to generate context CX in accordance with a context generating rule of the SIG pass, and the value of the current bit plane associated with that coefficient is designated as bit D of interest to be compressed. For details on the context generating rule, see specifications of JPEG-2000. This context CX is used to encode bit D of interest in the arithmetic encoding processing. After bit D of interest has been encoded, a sign bit indicative of positive or negative of this coefficient is encoded when bit D of interest is "1." Also, when bit D of interest is "1," this coefficient is handled as a significant coefficient from then on.

In the magnitude refinement pass (hereinafter called the "REF pass"), the processing is performed on a coefficient which has already been significant in a bit plane higher than the current bit plane. Here, a coefficient which becomes significant in a bit plane currently under processing is not included in coefficients to be processed. When a coefficient is subjected to the processing of the REF pass, the state around the bit of interest is monitored to determine whether or not a coefficient has become significant in a bit plane immediately above the current bit plane, and context CX and bit D to be compressed are generated and arithmetically encoded.

In the cleanup pass (hereinafter called the "CLN pass"), coefficients which have not been processed in the SIG pass or REF pass are subjected to the processing of the CLN pass, and context CX and bit D to be compressed are generated and arithmetically encoded.

The three passes are processed in the order of the SIG pass, REF pass, and CLN pass. After the processing in the respective passes has been performed for an entire code block, a transition is made to the processing in the next pass. Therefore, in the coefficient bit modeling, the pass is searched three times for each bit plane. As such, an immense number of calculations are required. Also, during the decompression processing, bits decoded by the arithmetic encoding must be referenced to determine the next pass and context CX, making it more difficult to perform the decompression processing at higher speeds than the compression processing.

Japanese Patent Laid-open Application No. 2003-032493 (JP, P2003-032496A) discloses an image encoding apparatus based on JPEG-2000 which comprises a plurality of bit plane generators each for slicing image data every bit plane and reading the sliced image data, and a plurality of encoders each for independently encoding data of each read bit plane, for purposes of reducing a computing time and saving a memory capacity.

Japanese Patent Laid-open Application No. 2003-087571 (JP, P2003-087571A) discloses a JPEG-2000-based image encoding apparatus which comprises coefficient bit modeling means for modeling conversion coefficients in a code block in order to reduce the encoding of a useless cleanup pass. The modeling means has detecting means for detecting a conversion coefficient which has not been encoded in a significance propagation pass and/or a magnitude refine pass, and encoding means for encoding a conversion coefficient detected by the detecting means in a cleanup pass.

Japanese Patent Laid-open Application No. 2003-101951 (JP, P2003-101951A) discloses an imaging apparatus which comprises a plurality of image compressing means which support different image compression schemes. In the imaging apparatus, imaging data is compressed by parallel processing of the image compressing means and is stored in the form of different compressed image files on a storage medium.

Japanese Patent Laid-open Application No. 2003-153228 (JP, P2003-153228A) discloses a JPEG-2000-based image encoding apparatus which has means for separating and extracting an encoded code stream to be encrypted from encoded code streams for preventing an increase in the data amount after encryption, encrypting means for encrypting the extracted encoded code stream, and means for writing the encrypted data back into the original encoded code stream at the same position.

Figure 3:
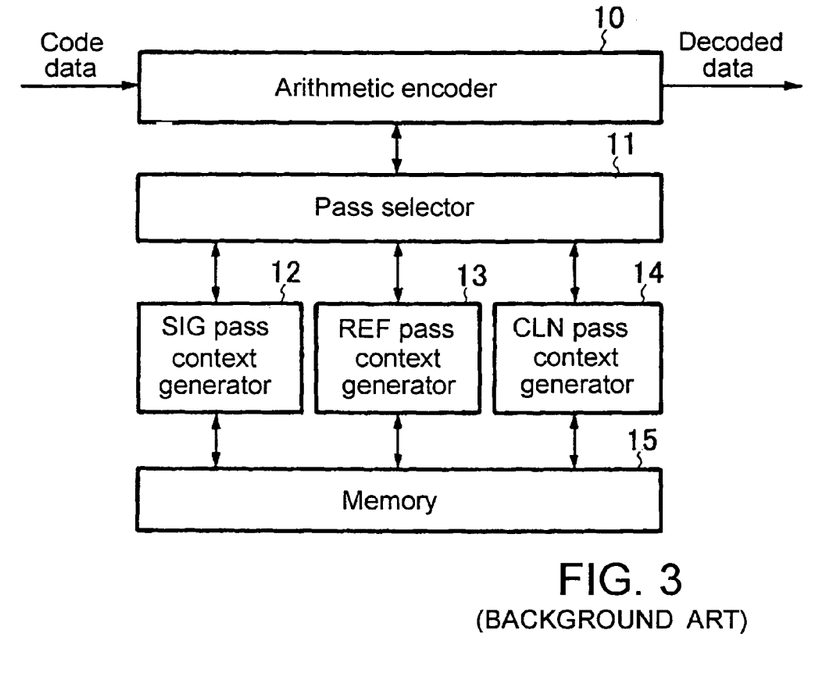
FIG. 3 is a block diagram illustrating the configuration of a coefficient bit modeling unit in a conventional image compression/decompression apparatus.

FIG. 3 illustrates blocks for performing the processing involved in the coefficient bit modeling and arithmetic encoding when data is decompressed. Code data is supplied to arithmetic encoder 10 which generates decoded data. In this event, a context generated by the coefficient bit modeling processing is used in the arithmetic encoding. The context is generated by one of SIG pass context generator 12, REF pass contest generator 13, and CLN pass context generator 14.

First, SIG pass context generator 12 determines whether or not the data is subjected to a SIG pass. When the data is subjected to the SIG pass, the context is supplied to arithmetic coder 10. When the data is not subjected to the SIG pass, SIG pass context generator 12 determines whether or not the next data is subjected to the SIG pass without supplying any data to arithmetic coder 10. When SIG pass context generator 12 has processed the current code block in the current bit plane, REF pass context generator 13 next determines whether or not data is subjected to a REF pass. When the data is subjected to the REF pass, REF pass context generator 13 supplies a context calculated thereby to arithmetic coder 10. When the data is not subjected to the REF pass, REF pass context generator 13 determines whether or not the next data is subjected to the REF pass. After REF pass context generator 13 has processed the current code block in the current bit plane, CLN pass context generator 14 finally generates a context for data subjected to a CLN pass. After CLN pass context generator 14 has processed the current code block in the current bit plane, a transition is made to the processing for the next bit plane, causing SIG pass context generator 12 to again perform the processing.

Pass selector 11 selects a currently processed pass, and switches to the next pass each time the processing has been terminated in one pass. Memory 15 stores information on the state of each coefficient for the current code block, i.e., whether a coefficient is significant, whether this is the first REF pass, whether the coefficient has been processed, and the like, and is referenced and/or updated as required in the processing of each pass. Decoded data is also supplied to a corresponding context generator for generating next context CX.

As will be understood from the operations of the foregoing blocks, since the respective passes are processed in sequence, a long time is necessarily required for the processing.

SUMMARY OF THE INVENTION

It is an object of the present invention to provide a digital image encoding apparatus which is capable of effectively performing coefficient bit modeling processing in compression/decompression processing in accordance with JPEG-2000 to compress an image or picture at high speeds in accordance with JPEG-2000.

It is another object of the present invention to provide a digital image decoding apparatus which is capable of effectively performing coefficient bit modeling processing in the compression/decompression processing in accordance with JPEG-2000 to decompress an image or picture at high speeds in accordance with JPEG-2000.

According to a first aspect of the present invention, there is provided an image encoding apparatus which comprises first processing means for determining whether or not each bit in a bit plane of a code block should be processed in a first pass, and second processing means for determining whether or not each bit in a bit plane of a code block should be processed in a second pass which is other than the first pass. In this encoding apparatus, the first processing means and the second processing means operate in parallel for the same bit plane of the same code block.

According to a second aspect of the present invention, there is provided an image decoding apparatus which comprises first processing means for determining whether or not each bit in a bit plane of a code block should be processed in a first pass, and second processing means for determining whether or not each bit in a bit plane of a code block should be processed in a second pass other than the first pass. In this decoding apparatus, the first processing means and the second processing means operate in parallel for the same bit plane of the same code block.

A conventional digital image encoding apparatus for performing the compression in accordance with JPEG-2000 scheme, and image decoding apparatus for performing the decompression in accordance with JPEG-2000 scheme must sequentially perform coefficient bit modeling processing, and perform determination processing as many as three times for the same bit plane. In contrast, according to the present invention, a processing start timing for each pass is controlled in consideration of the characteristics of each pass, and a context and the like resulting from the determination are held in a buffer in the coefficient bit modeling processing, thereby making it possible to sequentially deliver data such as the context without pass determination processing to accomplish high speed compression processing and decompression processing.

The above and other objects, features, and advantages of the present invention will become apparent from the following description with reference to the accompanying drawings, which illustrate examples of the present invention.

DETAILED DESCRIPTION OF THE PREFERRED EMBODIMENTS

The present invention relates to a digital image encoding apparatus for compressing a digital image in accordance with JPEG-2000 scheme, and a digital image decoding apparatus for reproducing a digital image from encoded data compressed in accordance with JPEG-2000 scheme. According to the present invention, the encoding and decoding apparatuses are characterized in that in coefficient bit modeling processing for generating a context for use in arithmetic encoding and arithmetic decoding, the operation of each encoding pass, which has been conventionally executed in sequence, is executed partially in parallel to parallelly generate data which are buffered such that the data are immediately delivered when required. The encoding and decoding apparatuses can reduce a time required for searching a pass and perform both the decompression processing and compression processing at high speeds.

The digital image encoding apparatus and digital image decoding apparatus according to a preferred embodiment of the present invention is composed of blocks which are capable of performing basic compression/decompression in accordance with JPEG-2000, as illustrated in FIG. 1. Among the configuration illustrated in FIG. 1, the present invention is implemented in the internal configuration of coefficient bit modeling processing 4. The following description will show the configuration of the coefficient bit modeling processing by the digital image encoding apparatus and the digital image decoding apparatus according to the present embodiment.

Figure 4:
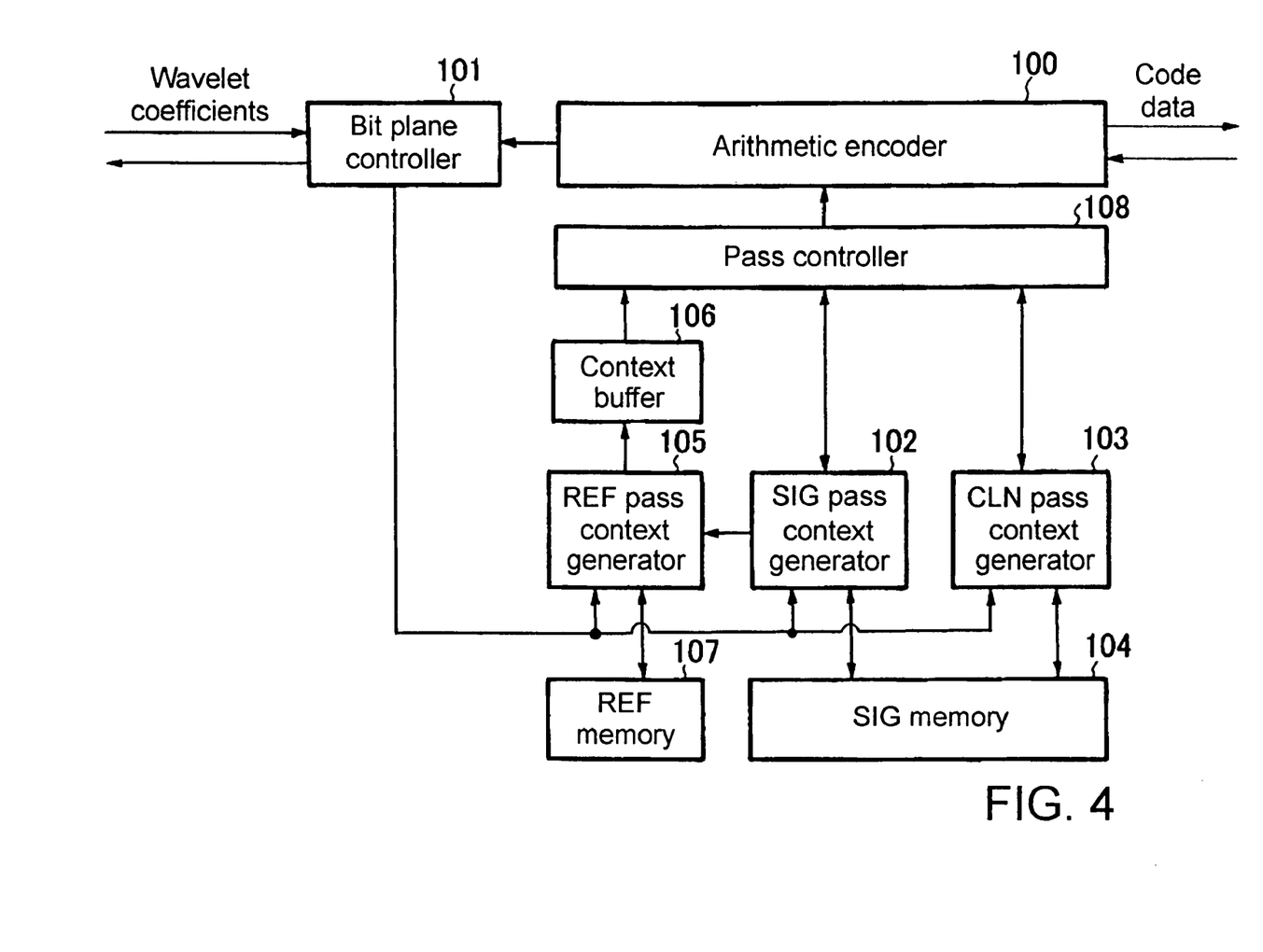
FIG. 4 is a block diagram illustrating the configuration of a coefficient bit modeling unit according to one embodiment of the present invention.

FIG. 4 illustrates the configuration of a coefficient bit modeling processing unit of the digital image encoding apparatus or digital image decoding apparatus in a preferred embodiment of the present invention. This block diagram supports both compression and decompression processing.

As illustrated in FIG. 4, the coefficient bit modeling processing comprises:

arithmetic coder 100 for encoding bit plane data using a context applied thereto to generate encoded data for compression, and for decoding encoded data applied thereto using a context applied thereto to deliver decoded data for decompression;

bit plane controller 101 for delivering wavelet coefficients in a code block to arithmetic coder 100 in order from the most significant bit (MSB) for compression, and for forming wavelet coefficients using code data delivered from arithmetic coder 100 for decompression;

SIG pass context generator 102 for determining whether or not a coefficient is subjected to a SIG pass with reference to a significant state of a coefficient in the current code block, generating and delivering a context and a bit to be compressed required for encoding for the compression processing, and for delivering a context required for decoding, and simultaneously determining a REF pass for compression processing;

CLN pass context generator 103 for determining whether or not a coefficient within a current code block is subjected to a CLN pass with reference to a significant state of the coefficient and a flag indicative of whether or not the coefficient has been processed in a current bit plane, and generating and delivering a context required for encoding and a bit to be compressed for compression processing, or delivering a context required for decoding for decompression processing, with respect to the coefficient subjected to the CLN pass;

SIG memory 104 for holding a flag indicative of the significant state of each coefficient within the current code block, and the like;

REF pass context generator 105 for determining whether or not a coefficient within the current code block is subjected to a REF pass with reference to a significant state of the coefficient, and generating and delivering a context required for encoding and a bit to be compressed for the compression processing, or delivering a context required for decoding for the decompression processing, with respect to the coefficient subjected to the REF pass;

context buffer 106 for buffering contexts and compressed bits generated by REF pass context generator 105 in order for the compression processing, and buffering the context alone in order for the decompression processing;

REF memory 107 for holding a state flag referenced for determining whether or not a coefficient is subjected to the REF pass; and pass controller 108 for controlling whether to use the context generated by SIG pass context generator 102, or the context generated by CLN pass context generator 103, or the context generated by REF pass context generator 105.

Now, description will be made on the operation of the apparatus illustrated in FIGS. 1 and 4 from the operation involved in the decompression processing.

Code data applied to the apparatus is assumed to be a JPEG-2000 code stream or a code stream related to a certain tile within a JPEG-2000 code stream. These code streams may be retrieved from a communication device and a communication module such as a device connected to the Internet, a facsimile device and the like, or a storage medium such as a memory, a CD (compact disc) and the like, and has undergone an analysis on a file format and the like before it is applied to the apparatus. The code data is also assumed to be arithmetic code data which has undergone an analysis on a header and the like, and has been arranged in an arbitrary order in which the code data should be decoded before it is applied to arithmetic coder 100 shown in FIG. 4. Arithmetic coder 100 decodes this code data using a context delivered from pass controller 108. The operation within arithmetic coder 100 for the decoding processing is, for example, a decompression operation of MQ-CODEC used in JPEG-2000, and for further details, see the specifications of JPEG-2000.

In the coefficient bit modeling processing in accordance with JPEG-2000, a pass determination is made for each bit plane and a context is generated using the processing of the appropriate pass. The pass determination specifies one pass from the SIG pass, REF pass and CLN pass in which data should be encoded or has been encoded. The passes are determined in the order of the SIG pass, REF pass, and CLN pass. When a check has been made for a whole bit plane within a current code block for a certain pass, the pass determination is made for the next pass. Therefore, the SIG pass is first checked for a bit plane within the current code block.

Figure 5:
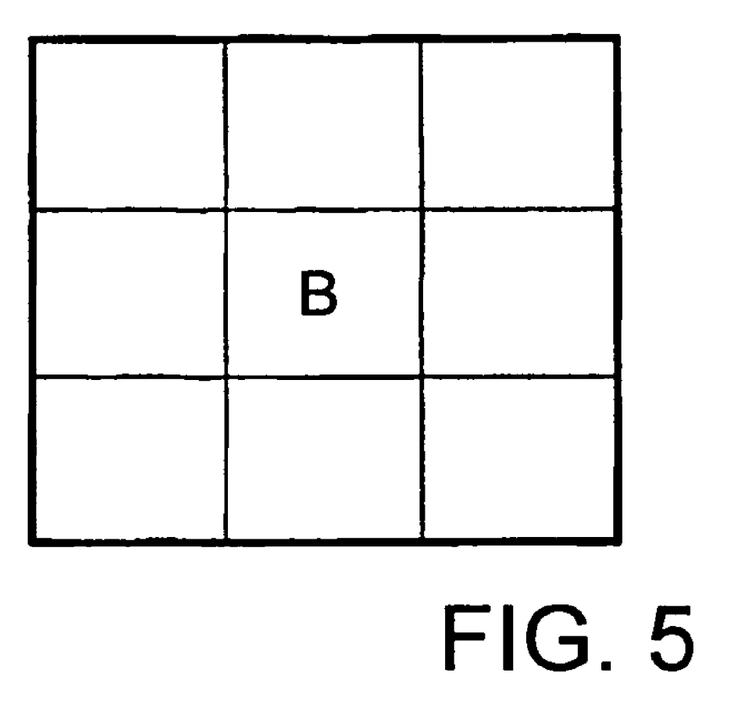
FIG. 5 is a diagram showing a bit for which a pass is determined and a bit used for the pass determination.

SIG pass contest generator 102 makes a pass determination as to whether or not current data on a current bit plane within the current code block should be processed in the SIG pass, and generates a context when it is data subjected to the processing in the SIG pass. SIG pass context generator 102 makes the pass determination on respective data within a bit plane in the order as shown in FIG. 2. The pass determination is made with reference to the significant state of surrounding pixels of the current data of interest as shown in FIG. 5. In FIG. 5, 'B' indicates the data within a bit plane which is to be currently encoded. Therefore, the significant state of the current code block must have been read from SIG memory 104 before the pass determination, and the significant state must be updated after the termination of the current pass determination for the pass determination on next data. Specifically, when the preceding data was data subjected to the SIG pass, the preceding data, i.e., the result of decoding must be reflected. When the pass determination determines that certain data is subjected to the SIG pass, a context is found in accordance with a context determining method defined by the SIG pass. In addition, SIG pass context generator 102 also updates a flag which indicates that the data has been processed in the SIG pass. This flag is stored in SIG memory 104 together with the aforementioned significant state. Here, SIG memory 104 may be updated every data, but is generally updated for several data in the mass. Therefore, SIG pass context generator 102 holds the significant state and processing completion flag about surrounding pixels for several data.

In addition to the processing described above, SIG pass context generator 102 further performs the following processing. SIG pass context generator 102 also makes a determination on the REF pass simultaneously with the pass determination on the SIG pass. The determination on the REF pass is made to see whether or not current data has become significant in the coefficient bit modeling processing for an upper bit plane than the current bit plane. When certain data is determined in the pass determination on the REF pass that it should be processed in the REF pass, SIG pass context generator 102 updates the processing completion flag to processing completed. In this way, a determination is made as to whether or not the pass determination processing for the REF pass has been completed simultaneously with the pass determination processing for the SIG pass.

While the pass determination on the REF pass is generally started after the processing in the SIG pass has been terminated on a current bit plane of a current code block, the pass determination processing is started for the REF pass before the processing in the SIG pass has been completed for the whole bit plane in the present invention. For generating a context for the REF pass, reference is made to the significant state of surrounding pixels as shown in FIG. 5. Since the processing in both the SIG pass and REF pass involves scanning on the bit plane in the order indicated in FIG. 2, data around current data must have minimally undergone the processing of the SIG pass in order to perform the processing in the REF pass. Therefore, referring to FIG. 2, when P0 is the REF pass, P1, P32, P33 must have undergone the SIG pass determination processing. Also, for data P96, data P64, P65, P97, P128, P129 must have undergone the SIG pass determination processing. Therefore, in the example shown in FIG. 2, the pass determination processing for the REF pass may be started, in the earliest case, at the time the pass determination processing for the SIG pass has been terminated for data positioned at P129. While the processing in the REF pass involves a reference to the significant state, the result of decoding will not affect the pass determination or generation of a context for the next data. Therefore, given correct significant states, the processing can be performed independently. SIG pass context generator 102 supplies REF pass context generator 105 with the aforementioned pass determination processing start signal for the REF pass, and the significant state for the pass determination for the REF pass and the generation of a context.

REF pass context generator 105 determines whether or not current data should be processed in the REF pass, and generates a context which is delivered to context buffer 106 when the data should be processed in the REF pass. The processing of REF pass context generator 105 is triggered by the start signal delivered from SIG pass context generator 102, and the significant state delivered from SIG pass context generator 102 is referenced to make a pass determination and to generate a context. Since the significant state has been delivered from SIG pass context generator 102 before REF pass context generator 105 starts its operation, REF pass context generator 105 must hold this significant state until REF pass context processor 105 itself uses the significant state. Also, since the generation of a context requires information indicative of whether or not data is the first REF pass within the associated coefficient, a flag indicative of whether the data is the first REF pass must have been read from REF memory 107 before the pass determination is made for that data, and the flag must be updated if necessary after the pass determination processing. While REF memory 107 may be updated every data, REF memory 107 should be updated for several data in the mass from a viewpoint of faster processing.

The context generated by REF pass context generator 105 is temporarily stored in context buffer 106. The context data held in context buffer 106 is read by pass controller 108 for delivery to arithmetic coder 100 at the time the processing of SIG pass context generator 102 has terminated for the current bit plane. Since REF pass context generator 105 has started the processing substantially simultaneously with SIG pass context generator 102, REF pass context generator 105 has substantially terminated its operation when it starts reading context buffer 106. Therefore, REF pass context generator 105 is only required to read the context of the REF pass from context buffer 106. Consequently, a large reduction is accomplished in the pass determination processing time required by REF pass context generator 105. Context buffer 106 may have a size calculated by multiplying three bits by a code block size since for decompression there are three contexts for the REF pass.

After SIG pass context generator 102 and REF pass context generator 105 have terminated their processing, i.e., after all data within context buffer 106 have been used up, CLN pass context generator 103 is triggered to start its operation. CLN pass context generator 103 makes a pass determination as to whether or not current data should be processed in the CLN pass, and generates a context when the data should be processed in the CLN pass. CLN pass context generator 103 processes data within the current bit plane which have been processed in neither SIG pass context processor 102 nor REF pass context generator 105. Therefore, CLN pass context generator 103 makes the pass determination with reference to the SIG pass and REF pass processing completion flags which have been updated by SIG pass context generator 102. For generating a context in CLN pass context generator 103, the significant states of surrounding pixels are required as is the case with the generation of a context in SIG pass context generator 102, and the result of decoding a value can cause a change in data to be next decoded. Therefore, CLN pass context generator 103 cannot perform the processing for decompression simultaneously with SIG pass context generator 102 or REF pass context generator 105. Like SIG pass context generator 102, CLN pass context generator 103 must have read the significant state from SIG memory 104, and updates the significant state for the pass determination of next data after the decoding of current data. Also, the processing completion flag is initialized because it is a processing completion flag within the bit plane.

When SIG pass context generator 102, REF pass context generator 105, and CLN pass context generator 103 have terminated their processing as described above, the processing is again started for the next bit plane from the processing of SIG pass context generator 102. Arithmetic coder 100 decodes data using the contexts generated in the foregoing manner. Bit plane controller 101 reconfigures wavelet coefficients using the data decoded by arithmetic coder 100.

The reconfigured wavelet coefficients undergo inverse quantization, inverse wavelet transform, color conversion, and the like to reproduce an image. The reproduced image is supplied to a display device, an output device such as a printer, or a recording medium such as a memory, CD, DVD (Digital Versatile Disc), and the like.

Next, description will be made on the operation involved in the compression processing.

Image data applied to a digital image encoding apparatus may be provided from an input device such as a scanner, a digital still camera and the like, or a storage medium such as a memory, CD and the like. The applied image data is converted to wavelet coefficients through the color conversion, wavelet transform, quantization, and the like, and applied to the coefficient bit modeling processor shown in FIG. 4. The wavelet coefficients applied to bit plane controller 101 are delivered every code block in order from the highest bit plane to SIG pass context generator 102, REF pass context generator 105, and CLN pass context generator 103.

The context generation processing in the respective passes is started from SIG pass context generator 102 as is the case with the decompression. SIG pass context generator 102 performs a pass determination for the SIG pass, the generation of a context for the SIG pass, a pass determination for the REF pass, an update of SIG memory 104, and the like, in a manner similar to those in the decompression. Further, because of the compression processing, SIG pass context generator 102 generates a bit to be actually compressed. Therefore, SIG pass context generator 102 supplies the bit to be compressed together with a context to the pass controller 108.

REF pass context generator 105 is triggered by a start signal applied from SIG pass context generator 102 to start the processing, as is the case with the decompression processing, to make a pass determination and generate a context using the significant state applied from SIG pass context generator 102. REF pass context generator 105 also generates a bit to be compressed which is supplied to context buffer 106. Therefore, context buffer 106 requires a capacity calculated by multiplying (3 bit+1 bit) by a code block size for the compression processing.

CLN pass context generator 103 also performs similar processing to that during the decompression, and additionally generates a bit to be actually compressed, and supplies pass controller 108 with a generated context and bit to be compressed.

The generated context and bit to be compressed are delivered from pass controller 108 to arithmetic coder 100 which encodes the context and bit and delivers the encoded result. The processing of arithmetic coder 100 includes, for example, a compression operation for MQ-CODEC used in JPEG-2000. The delivered code data is subsequently formed into a JPEG-2000 code stream which is delivered to the Internet, a communication device such as a facsimile device, a recording medium such as a memory, CD and DVD, as a JPEG-2000 code stream or a file which contains the code stream.

The foregoing description has been made on an exemplary operation involved in the compression/decompression processing in this embodiment. While a block configuration given in the exemplary operation supports both compression and decompression, a compression block and a decompression block can be provided separately. In this scenario, a further improvement can be made on the compression block.

Figure 6:
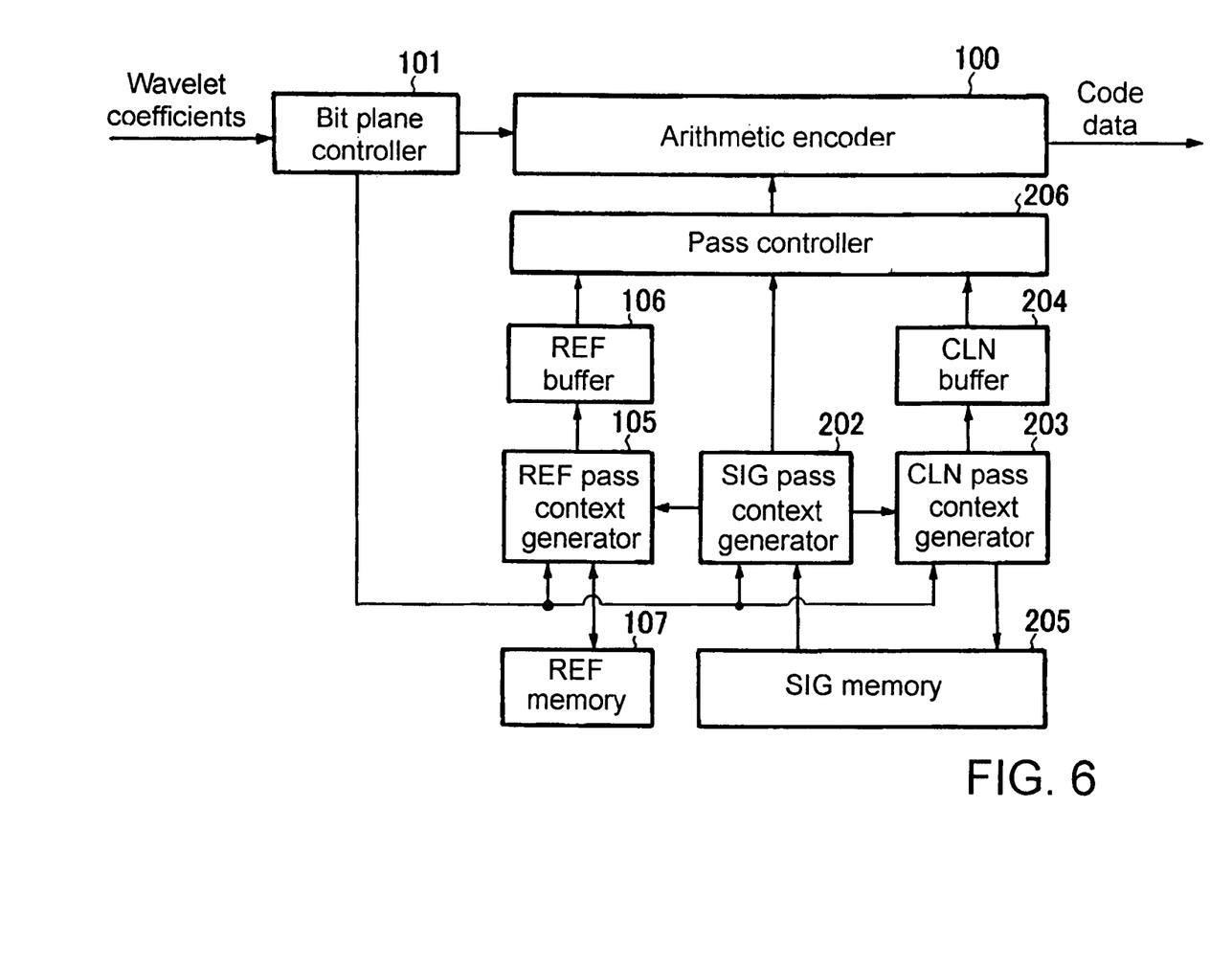
FIG. 6 is a block diagram illustrating the configuration of a coefficient bit modeling unit according to another embodiment of the present invention.

FIG. 6 illustrates a block diagram of a compression processor in a digital image encoding apparatus in another embodiment of the present invention. Since the compression processor in FIG. 6 is substantially similar in configuration to the compression processor in FIG. 4, differences between the two embodiments will be described below. CLN buffer 204 temporarily stores a context and a bit to be compressed generated by CLN pass context generator 203. The following description will be focused on an operation sequence of a compression block in FIG. 6. However, operations not specifically noted are similar to the operations associated with the compression in FIG. 4.

In the exemplary operation described above, CLN pass context generator 103 starts the operation after SIG pass context generator 102 and REF pass context generator 105 have finished their operations. However, contrary to the case with the decompression of current data, the preceding data has been already found without the need for waiting for the result of decoding in the compression, so that CLN pass context generator 203 can independently make a pass determination, generate a context, and generate a bit to be compressed if the significant state is correctly updated for surrounding pixels of current data and if CLN pass context generator 203 can determine data to be processed thereby. CLN pass context generator 203 references the significant states of surrounding pixels as shown in FIG. 5 for making a pass determination and generating a context. Therefore, when P0, for example, is a CLN pass in FIG. 2, the CLN pass determination processing must be terminated for P1, P32, P33, and when P96 is data of the CLN pass, the CLN pass determination processing must be terminated for P64, P65, P97, P128, P128. Thus, the pass determination processing for the CLN pass may be started, in the earliest case, at the time the SIG pass determination processing has been terminated for data positioned at P129.

SIG pass context generator 202 generates the significant state to CLN pass context generator 203 as well in a manner similar to the supply of the significant state to REF pass context generator 105. SIG pass context generator 202 also generates a processing completion flag. For this reason, CLN pass context generator 203 contains a buffer for holding a certain amount of the significant states and processing completion flags. CLN pass context generator 203 updates the state of SIG memory 205 after it has terminated the processing on each data. While the update may be made every data, CLN pass context generator 203 preferably updates several data in the mass. SIG memory 205 holds only the significant state.

The context and a bit to be compressed, generated by CLN pass context generator 203, are temporarily held in CLN buffer 204. Each data in CLN buffer 204 is sequentially supplied to pass controller 206 after REF pass context generator 105 has terminated its processing, i.e., after REF buffer 106 is free of data.

In this way, REF pass context generator 105 and CLN pass context generator 203 can make the pass determination substantially simultaneously with the processing of SIG pass context generator 202, and the compression processing in the REF pass and the compression processing in the CLN pass can be performed after SIG pass context generator 202 has terminated its operation, resulting in a higher processing speed.

The foregoing description has been made on an exemplary operation of the digital image encoding apparatus, which utilizes the present invention, associated with the compression processing. When this operation is applied, a plurality of bit planes can be processed in parallel with a particular time interval even in consideration of the processing time for the CLN pass. In this event, though the processing speed is improved, resources are increased, including the circuit scale, memory and the like.

While the foregoing embodiments have been described in connection with a digital image encoding apparatus and a digital image decoding apparatus, each of the encoding apparatus and the decoding apparatus can be configured only in hardware or partially implemented in software. Also, the present invention can be applied to devices which can receive and deliver images, for example, a scanner, a facsimile device, a digital copier, a digital still camera, a mobile terminal having a camera function, a printer, a display, a projector, and the like.

While preferred embodiments of the present invention have been described using specific terms, such description is for illustrative purposes only, and it is to be understood that changes and variations may be made without departing from the spirit or scope of the following claims.

What is claimed is:

1. An image encoding apparatus comprising:
    first processing means for determining whether or not each bit in a bit plane of a code block should be processed in a first pass, said first processing means generates a significance propagation pass context associated with said first pass for a bit which is determined to be processed in said first pass, said first processing means generates and delivers said significance propagation pass context required for encoding and a bit to be compressed, and simultaneously determines a magnitude refinement pass;
    second processing means for determining whether or not each bit in a bit plane of a code block should be processed in a second pass which is other than said first pass, said second processing means uses a result of the processing performed by said first processing means, and generates a magnitude refinement pass context associated with said second pass for a bit which is determined to be processed in said second pass, said second processing means generates and delivers said magnitude refinement pass context required for encoding and a bit to be compressed with respect to a wavelet coefficient subjected to said magnitude refinement pass; and
    storage means, wherein said first processing means reads and writes a significant state of each bit from and into said storage means, and manipulates a flag which indicates whether or not each bit should be processed in said first pass, and
    wherein said first processing means and said second processing means operate in parallel for the same bit plane of the same code block.

2. The apparatus according to claim 1, further comprising third processing means for determining whether or not each bit in a plane of a code block should be processed in a third pass which is other than said first pass and said second pass, wherein said first processing means, said second processing means and said third processing means operate in parallel for the same bit plane of the same code block.

3. The apparatus according to claim 2, wherein said third processing means generates a cleanup pass context associated with said third pass for a bit which is determined to be processed in said third pass.

4. The apparatus according to claim 2, wherein said first pass is a significance propagation pass used in a JPEG-2000 processing, said second pass is a magnitude refinement pass used in the JPEG-2000 processing, and said third pass is a cleanup pass used in the JPEG-2000 processing.

5. The apparatus according to claim 1, wherein said first pass is a significance propagation pass used in a JPEG-2000 processing, and said second pass is a magnitude refinement pass used in the JPEG-2000 processing.

6. An image decoding apparatus comprising:
    first processing means for determining whether or not each bit in a bit plane of a code block should be processed in a first pass, said first processing means generates a significance propagation pass context associated with said first pass for a bit which is determined to be processed in said first pass, said first processing means generates and delivers said significance pass context required for decoding, and simultaneously determines a magnitude refinement pass;
    second processing means for determining whether or not each bit in a bit plane of a code block should be processed in a second pass which is other than said first pass, said second processing means uses result of the processing performed by said first processing means, and generates a magnitude refinement pass context associated with said second pass for a bit which is determined to be processed in said second pass, said second processing means generates and delivers said magnitude refinement pass context required for decoding with respect to a wavelet coefficient subjected to said magnitude refinement pass; and
    storage means, wherein said first processing means reads and writes a significance state of each bit from and into said storage means, and manipulates a flag which indicates whether or not each bit should be processed in said first pass; and wherein said first processing means and said second processing means operate in parallel for the same bit plane of the same code block.

7. The apparatus according to claim 6, further comprising third processing means for determining whether or not each bit in a bit plane of a code block should be processed in a third pass which is other than said first pass and said second pass,
wherein after said first processing means and said second processing means have operated for the same bit plane of the same code block in parallel, said third processing means operates for said same bit plane of said same code block.

8. The apparatus according to claim 7, wherein said third processing means generates a cleanup pass context associated with said third pass for a bit which is determined to be processed in said third pass.

9. The apparatus according to claim 7, wherein said first pass is a significance propagation pass used in a JPEG-2000 processing, said second pass is a magnitude refinement pass used in the JPEG-2000 processing, and said third pass is a cleanup pass used in the JPEG-2000 processing.

10. The apparatus according to claim 6, wherein said first pass is a significance propagation pass used in a JPEG-2000 processing, and said second pass is a magnitude refinement pass used in the JPEG-2000 processing.

11. An image encoding method using a processor for performing the steps comprising:
a first processing step for determining whether or not each bit in a bit plane of a code block should be processed in a first pass, said first processing step comprises:
a step of generating a significance propagation pass context associated with said first pass for a bit which is determined to be processed in said first pass, said determination being made with reference to a significance state of surrounding bits,
reading and writing said significance state of each bit from and into a storage;
manipulating a flag which indicates whether or not each bit should be processed in said first pass, and
determining a magnitude refinement pass simultaneously; and
a second processing step for determining whether or not each bit in a bit plane of a code block should be processed in a second pass which is other than said first pass, said second processing step uses result of said first processing step, and comprises the step of generating a magnitude refinement pass context required for encoding with respect to a wavelet coefficient associated with said second pass for a bit which is determined to be processed in said second pass,
wherein said first processing step and said second processing step operate in parallel for the same bit plane of the same code block.

12. The method according to claim 11, further comprising a third processing step for determining whether or not each bit in a bit plane of a code block should be processed in a third pass which is other than said first pass and said second pass,
wherein said first processing step, said second processing step and said third processing step operate in parallel for the same bit plane of the same code block.

13. The method according to claim 12, wherein said third processing step includes generating a cleanup pass context associated with said third pass for a bit which is determined to be processed in said third pass.

14. The method according to claim 12, wherein said first pass is a significance propagation pass used in a JPEG-2000 processing, said second pass is a magnitude refinement pass used in the JPEG-2000 processing, and said third pass is a cleanup pass used in the JPEG-2000 processing.

15. The method according to claim 11, wherein said first pass is a significance propagation pass used in a JPEG-2000 processing, and said second pass is a magnitude refinement pass used in the JPEG-2000 processing.

16. An image decoding method using a processor for performing the steps comprising:
a first processing step for determining whether or not each bit in a bit plane of a code block should be processed in a first pass, said first processing step comprises steps of:
generating a significance propagation pass context associated with said first pass for a bit which is determined to be processed in said first pass, said determination being made with reference to a significance state of surrounding bits,
reading and writing said significance state of each bit from and into storage means,
manipulating a flag which indicates whether or not each bit should be processed in said first pass, and
determining a magnitude refinement pass simultaneously; and
a second processing step for determining whether or not each bit in a bit plane of a code block should be processed in a second pass which is other than first pass, said second processing step uses result of said first processing step, said second processing step comprises the step of generating a magnitude refinement pass context required for encoding with respect to a wavelet coefficient associated with said second pass for a bit which is determined to be processed in said second pass;
wherein said first processing step and said second processing step operate in parallel for the same bit plane of the same code block.

17. The method according to claim 16, further comprising third processing step for determining whether or not each bit in a bit plane of a code block should be processed in a third pass which is other tan said first pass and said second pass,
wherein after said first processing step and said second processing step have operated for the same bit plane of the same code block in parallel, said third processing step operates for said same bit plane of said same code block.

18. The method according to claim 17, wherein said third processing step includes generating a cleanup pass context associated with said third pass for a bit which is determined to be processed in said third pass.

19. The method according to claim 17, wherein said first pass is a significance propagation pass used in a JPEG-2000 processing, said second pass is a magnitude refinement pass used in the JPEG-2000 processing, and said third pass is a cleanup pass used in the JPEG-2000 processing.

20. The method according to claim 16, wherein said first pass is a significance propagation pass used in a JPEG-2000 processing, and said second pass is a magnitude refinement pass used in the JPEG-2000 processing.

21. An image encoding/decoding apparatus comprising:
an arithmetic coder for encoding bit plane data using a context applied thereto to generate encoded data for compression processing, and for decoding encoded data applied thereto using a context applied thereto to deliver decoded date for decompression processing;
a bit plane controller for delivering wavelet coefficients in a code block to the arithmetic coder in order from the most significant bit for the compression processing, and for forming wavelet coefficients using code data delivered from the arithmetic coder for the decompression processing;

a significance propagation pass context generator for determining whether or not a coefficient is subjected to a significance propagation pass with reference to a significant state of a coefficient in the current code block, and simultaneously determining a magnitude refinement pass, wherein said significance propagation pass context generator generates and delivers a context and a bit to be compressed required for encoding for the compression processing, and delivers a context required for decoding for the decompression processing;

a cleanup pass context generator for determining whether or not a coefficient within a current code block is subjected to a cleanup pass with reference to a significant state of the coefficient and a flag indicative of whether or not the coefficient has been processed in a current bit plane, wherein said cleanup pass context generator generates and delivers a context required for encoding and a bit to be compressed for the compression processing, and delivers a context required for decoding for the decompression processing, with respect to the coefficient subjected to the cleanup pass;

a significance memory for holding a flag indicative of the significant state of each coefficient within the current code block;

a magnitude refinement pass context generator for determining whether or not a coefficient within the current code block is subjected to a magnitude refinement pass with reference to a significant state of the coefficient, wherein said magnitude refinement pass context generator generates and delivers a context required for encoding and a bit to be compressed for the compression processing, and delivers a context required for decoding for the decompression processing, with respect to the coefficient subjected to the magnitude refinement pass;

a context buffer for buffering contexts and compressed bits generated by the magnitude refinement pass context generator in order for the compression processing, and buffering the context alone in order for decompression processing;

a refinement memory for holding a state flag referenced for determining whether of not a coefficient is subjected to the magnitude refinement pass; and a pass controller for controlling whether to use the context generated by the significance propagation pass context generator, or the context generated by the cleanup pass context generator, or the context generated by the magnitude refinement pass context generator, wherein the significance propagation pass context generator, and the magnitude refinement pass context generator operate in parallel.

22. An image encoding apparatus comprising:

an arithmetic coder for encoding bit plane data using a context applied thereto to generate encoded data;

a bit plane controller for delivering wavelet coefficients in a code block to the arithmetic coder in order from the most significant bit;

a significance propagation pass context generator for determining whether or not a coefficient is subjected to a significance propagation pass with reference to a significant state of a coefficient in the current code block, generating and delivering a context and a bit to be compressed required for encoding, and simultaneously determining a magnitude refinement pass;

a cleanup pass context generator for determining whether or not a coefficient within a current code block is subjected to a cleanup pass with reference to a significant state of the coefficient and a flag indicative of whether or not the coefficient has been processed in a current bit plane, and generating and delivering a context required for encoding and a bit to be compressed with respect to the coefficient subjected to the cleanup pass;

a significance memory for holding a flag indicative of the significant state of each coefficient within the current code block;

a magnitude refinement pass context generator for determining whether or not a coefficient within the current code black is subjected to a magnitude refinement pass with reference to a significant state of the coefficient, and generating and delivering a context required for encoding and a bit to be compressed with respect to the coefficient subjected to the magnitude refinement pass;

a context buffer for buffering contexts and compressed bits generated by the magnitude refinement pass context generator in order for the compression processing;

a refinement memory for holding a state flag referenced for determining whether or not a coefficient is subjected to the magnitude refinement pass;

a cleanup buffer for temporarily storing a context and a bit to be compressed generated by the cleanup pass context generator; and a pass controller for controlling whether to use the context generated by the significance propagation pass context generator, or the context generated by the cleanup pass context generator, or the context generated by the magnitude refinement pass context generator, wherein the significance propagation pass context generator, the magnitude refinement pass context generator, and the cleanup pass context generator operate in parallel.

* * * * *